United States Patent
Hancill et al.

(10) Patent No.: US 9,868,813 B2
(45) Date of Patent: Jan. 16, 2018

(54) THERMOSETTING DURABLE POWDER COATING COMPOSITION

(71) Applicant: AKZO NOBEL COATINGS INTERNATIONAL B.V., Arnhem (NL)

(72) Inventors: Virginie Marcelle Andrée Hancill, Tyne and Wear (GB); Michele Falcone, Como (IT); Ergin Basar, Izmir (TR)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 57 days.

(21) Appl. No.: 15/156,070

(22) Filed: May 16, 2016

(65) Prior Publication Data

US 2016/0257781 A1    Sep. 8, 2016

Related U.S. Application Data

(62) Division of application No. 14/235,519, filed as application No. PCT/EP2012/064983 on Aug. 1, 2012, now Pat. No. 9,365,740.

(60) Provisional application No. 61/525,282, filed on Aug. 19, 2011.

(30) Foreign Application Priority Data

Aug. 4, 2011 (EP) .................... 11176540

(51) Int. Cl.
| | |
|---|---|
| C08G 18/42 | (2006.01) |
| C08F 283/00 | (2006.01) |
| C08G 63/12 | (2006.01) |
| C09D 5/03 | (2006.01) |
| C08G 63/20 | (2006.01) |
| C08G 63/91 | (2006.01) |
| C09D 167/00 | (2006.01) |
| C09D 167/02 | (2006.01) |
| C08G 63/78 | (2006.01) |
| C08L 67/00 | (2006.01) |

(52) U.S. Cl.
CPC ............ *C08G 63/12* (2013.01); *C08G 63/20* (2013.01); *C08G 63/78* (2013.01); *C08G 63/914* (2013.01); *C08G 63/916* (2013.01); *C09D 5/032* (2013.01); *C09D 167/00* (2013.01); *C09D 167/02* (2013.01); *C08L 67/00* (2013.01)

(58) Field of Classification Search
None
See application file for complete search history.

(56) References Cited

U.S. PATENT DOCUMENTS

| | | | |
|---|---|---|---|
| 5,264,529 A | 11/1993 | Nozaki et al. | |
| 6,660,398 B1 | 12/2003 | Moens et al. | |
| 2004/0087736 A1 | 5/2004 | Wu et al. | |

FOREIGN PATENT DOCUMENTS

| | | |
|---|---|---|
| JP | 2006-070082 A | 3/2006 |
| WO | WO 91/14745 | 10/1991 |
| WO | WO/01/70893 | 9/2001 |
| WO | WO 2004/026981 | 4/2004 |
| WO | WO 2008/125417 | 10/2008 |

OTHER PUBLICATIONS

International Search Report and Written Opinion for International Application No. PCT/EP2012/064983 dated Sep. 11, 2012.
International Preliminary Report on Patentability for International Application No. PCT/EP2012/064983 dated Feb. 13, 2013.
European Search Report for Application No. 11176540.0 dated Dec. 22, 2011.
T.A. Misev, Powder Coatings: Chemistry and Technology, John Wiley & Sons,1991, ISBN 0 471 92821 6, pp. 144-153.

*Primary Examiner* — Robert T Butcher
(74) *Attorney, Agent, or Firm* — McDonnell Boehnen Hulbert & Berghoff LLP

(57) ABSTRACT

The invention comprises a thermosetting powder coating composition comprising first and second resin, the first resin being an acid functional polyester resin with an acid value below 50 mg KOH/g, the second resin being obtainable by reacting hydroxyl functional components and acid functional components, the hydroxyl functional components containing 2 hydroxyl functional groups per molecule and/or at least 3 hydroxyl functional groups per molecule, the acid functional components containing 2 acid functional groups per molecule and/or at least 3 acid functional groups per molecule, wherein more than 90 mol. % of the total of hydroxyl functional components in the second resin originate from neopentyl glycol (NPG), and from 6 to 11 mol % of the total of hydroxyl functional components and acid functional components in the second resin originating from hydroxyl functional components and/or acid functional components having at least 3 functional groups per molecule.

6 Claims, No Drawings

THERMOSETTING DURABLE POWDER COATING COMPOSITION

REFERENCE TO RELATED APPLICATIONS

This application is a divisional application of U.S. patent application Ser. No. 14/235,519, filed on Apr. 14, 2014, which is a U.S. National Phase Application of PCT/EP2012/064983, filed on Aug. 1, 2012, both of which are incorporated herein by reference it their entireties, and which claims the benefit of U.S. Provisional Application No. 61/525,282, filed on Aug. 19, 2011, and EP Application No. 11176540.0, filed on Aug. 4, 2011.

Powder coating compositions are solid compositions that generally comprise a solid film-forming resin or mixtures of different kind of resins, usually with one or more pigments and, optionally, one or more performance additives such as plasticizers, stabilizers, flow aids and extenders. The resins are usually thermosetting, incorporating, for example, a resin and a corresponding crosslinking agent (which may itself be another resin). Generally, the resins have a $T_g$, softening point or melting point above 30° C.

Conventionally, the manufacture of a powder coating comprises melt-mixing the components of the composition. Melt-mixing involves the high speed, high intensity mixing of dry ingredients and then the heating of the mixture to an elevated temperature—above the softening temperature of the resin but below the curing temperature—in a continuous compounder to form a molten mixture. The compounder preferably comprises a single or twin screw extruder as these serve to improve the dispersion of the other ingredients in the resin as the resin melts. The molten mixture is extruded, typically rolled in the form of a sheet, cooled to solidify the mixture and subsequently crushed or kibbled to flakes and subsequently pulverised to a fine powder Such processing is then generally followed by a sequence of particle sizing and separation operations—such as grinding, classifying, sifting, screening, cyclone separation, sieving and filtering—that precede the application of the powder to a substrate and the heating of that powder to melt and fuse the particles and to cure the coating. The main methods by which powder coatings are applied include fluidized-bed, wherein a substrate is preheated and dipped in a fluidised bed of the powder resulting in the powder fusing on contact with hot surface and adhering to the substrate, and electrostatic fluidized-bed processes and electrostatic spray processes in which the powder coating particles are electrostatically charged by electrodes within a fluid bed or by an electrostatic spray gun and directed to be deposited onto an earthed substrate.

Powder coatings can be used in a wide range of applications. One area where powder coatings are used is in the architectural area where powder coated metal panels are used to protect and decorate the outside of buildings.

In addition to corrosion protection, one of the requirements for such powder coatings for architectural use is their durability. Once the powder coated metal panels are mounted to a building, they should keep their physical appearance (amongst others color and gloss) for a large number of years.

Coatings with a guaranteed service life of more than 10 years in an outdoor environment are classified as superdurable products.

Powder coatings can be used to coat various types of substrates. For many applications it is required that these powder coating compositions show a high gloss when cured. However, there is also a growing demand for powder coatings that provide a durable coating with a reduced gloss or low gloss. For some applications it is even required for the coatings to have so-called "dead matt" characteristics, meaning that the cured coatings have a gloss of from 0 to 10% when measured at a 60° angle in accordance to ASTM D523.

In WO 2008/125417 thermosetting powder coatings are disclosed comprising two different thermosetting polyester resins and a crosslinking agent that can be used to prepare low gloss and dead matt coatings when cured. The polyester resins disclosed in this document are all prepared by reacting various types of hydroxyl functional components and various types of acid functional components. In the preparation at least 10 mol. % of ethylene glycol is used.

In U.S. Pat. No. 6,660,398 thermosetting powder coatings are disclosed comprising a blend of an amorphous polyester resin and a semicrystalline polyester resin and a crosslinking agent that can be used to prepare low gloss coatings when cured. The polyester resins disclosed in this document are all prepared by reacting various types of hydroxyl functional components and various types of acid functional components. Trimellitic acid can be used as one of the acid components in the preparation of the polyester resin, albeit at a maximum of 10 mol. %. The powder coating compositions disclosed in this document do not show (when cured) a desired combination of low gloss and good weatherability.

In JP 2006/070082 a resin composition for powder coatings is disclosed comprising an amorphous polyester resin and a crystalline polyester resin. No resin combinations are disclosed with a branched resin with a high acid value (>60 mg KOH/g) and another resin with a low acid value (<50 mg KOH/g). The powder coating compositions disclosed in this document do not show (when cured) a desired combination of low gloss and good weatherability.

In US 2004/087736 a resin for use in powder coatings is disclosed. No resin combinations are disclosed with a branched resin with a high acid value (>60 mg KOH/g) and another resin with a low acid value (<50 mg KOH/g). The powder coating compositions disclosed in this document do not show (when cured) a desired combination of low gloss and good weatherability.

In WO 2004/026981 a resin for use in powder coatings is disclosed. No resin combinations are disclosed with a branched resin with a high acid value (>60 mg KOH/g) and another resin with a low acid value (<50 mg KOH/g). The powder coating compositions disclosed in this document do not show (when cured) a desired combination of low gloss and good weatherability.

In WO 01/70893 a resin for use in powder coatings is disclosed. No resin combinations are disclosed with a branched resin with a high acid value (>60 mg KOH/g) and another resin with a low acid value (<50 mg KOH/g). The powder coating compositions disclosed in this document do not show (when cured) a desired combination of low gloss and good weatherability.

These known coatings systems have various disadvantages. It was found that systems comprising a polyester resin with at least 10% of the hydroxyl functional components originating from ethylene glycol show a poor weathering resistance. Systems comprising a polyester resin with less than 6 wt % of the total functional components having at least 3 hydroxyl and/or acid functional groups per molecule are not reactive enough to achieve dead matt Surprisingly, a new powder coating composition has been found that can be used to prepare substrates with low gloss and/or dead matt coatings when cured that show high reactivity and good outdoor durability.

The powder coating composition of the present invention is a thermosetting powder coating composition comprising a first resin and a second resin, the first resin being an acid functional polyester resin with an acid value below 50 mg KOH/g, the second resin being obtainable by reacting hydroxyl functional components and acid functional components, the hydroxyl functional components comprising components containing 2 hydroxyl functional groups per molecule and/or components containing at least 3 hydroxyl functional groups per molecule, the acid functional components comprising components containing 2 acid functional groups per molecule and/or components containing at least 3 acid functional groups per molecule, wherein more than 90 mol. % of the total of hydroxyl functional components in the second resin originate from neopentyl glycol (NPG), and from 6 to 11 mol % of the total of hydroxyl functional components and acid functional components in the second resin originating from hydroxyl functional components and/or acid functional components having at least 3 functional groups per molecule.

Hence, the second resin in the powder coating composition according to the present invention comprises from 89 to 94 mol % of the total of hydroxyl functional components and acid functional components in the resin originating from hydroxyl functional components and/or acid functional components having 2 functional groups per molecule.

In one embodiment of the invention, the thermosetting powder coating composition comprises a second resin wherein more than 95 mol. % of the total of hydroxyl functional components originate from neopentyl glycol.

In a further embodiment of the invention the thermosetting powder coating composition comprises a second resin wherein 12 to 20 mol % of the total of acid functional components in the resin originate from trimellitic acid or anhydride (TMA).

In a further embodiment of the invention the thermosetting powder coating composition comprises a second resin wherein the acid functional components in the resin originate from isophthalic acid (IPA), terephthalic acid (TPA) and/or adipic acid (AA).

In a further embodiment, the invention relates to a powder coating composition comprising a polyester resin prepared from hydroxyl functional components and acid functional components, wherein
more than 90 mol. % of the total of hydroxyl functional components in the resin originate from neopentyl glycol (NPG),
from 6 to 11 mol % of the total of hydroxyl functional components and acid functional components in the resin originating from hydroxyl functional components and/or acid functional components having at least 3 functional groups per molecule.

a polyester resin with an acid value below 50 mg KOH/g a crosslinker, and fillers In a further embodiment, the invention relates to a process for the preparation of an acid functional polyester resin having an acid value of at least 60 mg KOH/g, using hydroxyl functional components and acid functional components, the hydroxyl functional components comprising components containing 2 hydroxyl functional groups per molecule and/or components containing at least 3 hydroxyl functional groups per molecule, the acid functional components comprising components containing 2 acid functional groups per molecule and/or components containing at least 3 acid functional groups per molecule, wherein more than 90 mol. % of the total of hydroxyl functional components in the resin originate from neopentyl glycol (NPG), and from 6 to 11 mol % of the total of hydroxyl functional components and acid functional components in the resin originating from hydroxyl functional components and/or acid functional components having at least 3 functional groups per molecule.

and wherein in a first stage of the process all the hydroxyl functional components of the polymer are added to a reaction mixture as well as some acid functional components resulting in a hydroxyl functional pre-polymer and in a second stage the remaining acid functional components are added to the reaction mixture and wherein in the first stage 15-60 mol. % of all components having at least 3 hydroxyl and/or acid functional groups are added to the reaction mixture, and in the second stage 40-85 mol % of the remaining components having at least 3 acid functional groups are added to the reaction mixture.

The hydroxyl functional component in the second resin originates for at least 90 mol % from neopentylglycol and it may even consist entirely of neopentylglycol (100 mol %). The resin may furthermore contain up to 10 mol % of an aliphatic, cycloaliphatic or aromatic hydroxylated compound, other than neopentylglycol, such as ethylene glycol, propylene glycol, 1,4-butanediol, 1,6-hexanediol, 2-methyl-1,3propanediol, 2-butyl-2-ethyl-1,3-propanediol, 1,4-cyclohexanedimethanol, 1,4-cyclohexanediol, hydrogenated bisphenol A, neopentylglycol hydroxypivalate, trimethylolpropane, di-trimethylolpropane, pentaerythritol and mixtures thereof. Trimethylolpropane, di-trimethylolpropane, and pentaerythritol are examples of hydroxyl functional components having at least three hydroxyl functional groups per molecule.

The acid functional components in the second resin originate partially from a polycarboxylic acid, i.e. acid functional components containing at least 3 carboxylic groups per molecule. Examples of such polycarboxylic acids include trimellitic acid or anhydride and pyromellitic acid or anhydride.

The acid functional components in the second resin originate partially from a dicarboxilic acid, i.e. acid functional components having two acid functional groups. This dicarboxylic acid can be an aromatic, aliphatic or cyckloaliphatic dicarboxylic acid. Examples of suitable dicarboxylic acids include isophthalic acid, terephthalic acid, phthalic acid, succinic acid, glutaric acid, adipic acid, pimelic acid, suberic acid, azelaic acid, sebacic acid, fumaric acid, maleic acid, 1,3-cyclohexanedicarboxylic acid, 1,4-cyclohexanedicarboxylic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid and 1,16-hexadecanedioic acid.

In one embodiment the polyester resin is an acid-functional polyester resin having an acid value of at least 60 mg KOH/g. In a further embodiment the acid-functional polyester resin has an acid value of 70-110 mg KOH/g.

The polyester resin has a glass transition temperature in the range of 50-80° C. and a melt viscosity, measured using a cone/plate viscometer in accordance with ASTM D4287-88 in the range of 10-50 Pa·s, measured at 200° C.

The polyester resin that has a certain level of branching can be prepared in a conventional way following a 2 stage process. In the first stage all the hydroxyl functional components of the polymer are added as well as some acid functional components resulting in a hydroxyl functional pre-polymer. In the first stage typically 15-60 mol. % of all components having at least 3 acid or hydroxyl functional groups are added to the reaction mixture, in the second stage 40-85 mol % of the remaining components having at least 3 acid functional groups are added to the reaction mixture. In another embodiment, in the first stage 15-50 mol. % of all components having at least 3 acid or hydroxyl functional groups are added to the reaction mixture, in the second stage 50-85 mol % of the remaining components having at least 3 acid functional groups are added to the reaction mixture.

The composition according to the present invention also comprises as a first resin an acid functional polyester resin with a lower acid value. In one embodiment, this first resin has an acid value below 50 mg KOH/g. In a further embodiment, this first polyester resin has an acid value below 40 mg KOH/g.

This polyester resin can be prepared using the same hydroxyl functional components and acid functional components as mentioned above, provided that the acid value of this first resin is below 50 mg KOH/g.

The composition according to the present invention can comprise up to 80 wt. % of such acid functional polyester resin having a lower acid, the 80 wt. % based upon the total weight of polyester resins present in the composition.

Within the framework of the present invention, a crosslinker is a compound that can join two or more polymer chains by creating a covalent bond.

Commonly, triglycidylisocyanurate is used as a crosslinker for carboxy-functional polyesters. However, in one embodiment the present invention relates to a polyester powder coating composition wherein the curing agent for the polyester resin is substantially free of triglycidylisocyanurate (TGIC). Substantially free means that the total composition contains less than 5 wt. (based on the total weight of the composition) of TGIC, preferably less than 1 wt. %, more preferably less than 0.1 wt. %.

It was found that powder coating compositions with a very good durability and low gloss can be obtained if in the powder coating composition according to the present invention a hydroxyalkylamide compound is used as a curing agent. Examples of suitable curing agents include bis(beta-hydroxyalkylamide) curing agents such as tetrakis(2-hydroxyethyl) adipamide (Primid (Registered trademark) XL-552).

Further alternatives for TGIC include QM1260 (an hydroxyalkylamide available from EMS-Primid), Araldyte PT910 (a glycidyl ester available from Ciba Geigy), and Uranox (available from DSM)

In addition to the resin systems and a crosslinker, the polyester coating compositions may comprise other components that are conventionally known in the art. These may include: fillers, pigments, flow control agents, degassing agents, and antiblocking agents.

Further suitable additives may include: adhesion promoters; light stabilizers and UV absorbers; flow and leveling additives; gloss-modifying additives; cratering agents; cure agents; texturizers; surfactants; wetting agents; antioxidants (in particular phosphites, hindered phenols and propionates); biocides; and, organic plasticizers.

Examples of pigments which can be used are inorganic pigments such as titanium dioxide, red and yellow iron oxides, chrome pigments and carbon black and organic pigments such as, for example, phthalocyanine, azo, anthraquinone, thioindigo, isodibenzanthrone, triphendioxane, and quinacridone pigments, vat dye pigments and lakes of acid, basic and mordant dyestuffs. Dyes can be used instead of or as well as pigments.

Fillers may be employed to reduce cost and/or reinforce or modify the performance and appearance of the coatings. Fillers comprising glass particles, glass fibres, metal fibers, metal flakes and particles of micas or calcium metasilicate could be included in the powder coating compositions of this invention. Inorganic sulphates such as barites, carbonates such as chalk, and silicates such as talc are commonly used.

Metallics including zinc rich anticorrosive particulates may be added to powder coating compositions to impart corrosion resistance to the underlying substrate.

Flow control agents may be present in the powder coating compositions in an amount up to 3 wt. % based on the weight of the composition. Such flow control agents, which enhance the compositions melt-flow properties and assist in eliminating surface defects, typically include acrylics and fluorine based polymers. Examples of commercially available flow control agents include: Resiflow® P-67, Resiflow® P-200 and Clearflow® (all available from Estron Chemical Inc., Calvert City, Ky.); BYK® 361 and BYK® 300 from BYK Chemie (Wallingford, Conn.); Mondaflow® 2000 from Monsanto (St. Louis, Mo.); and, Acranal 4F from BASF.

Degassing agents can also be used in the powder coating compositions of the present invention in an amount between 0.1 and 5 wt. %, based on the weight of the composition. Such degassing agents facilitate the release of gases during the curing process. Examples of commercially available degassing agents include: Benzoin available from Well Worth Medicines; and, Uraflow® B available from GCA Chemical Corporation (Brandenton, Fla.).

In a conventional process for the manufacture of a powder coating composition, all ingredients of the powder coating are pre-mixed and thereafter melt-mixed in an extruder. The molten mixture is then cooled and kibbled or granulated and grinded into a powder coatings.

A powder coating composition according to the invention may in principle be applied to a substrate by any of the processes of powder coating technology, for example, by electrostatic spray coating (corona-charging or tribo-charging) or by fluidized-bed or electrostatic fluidized-bed processes.

After application of the powder coating composition to a substrate, conversion of the resulting adherent particles into a continuous coating (including, where appropriate, curing of the applied composition) may be effected by heat treatment and/or by radiant energy, notably infra-red, ultraviolet, or electron beam radiation.

The powder is usually cured on the substrate by the application of heat (the process of stoving); the powder particles melt and flow, and a film is formed. The curing times and temperatures are interdependent in accordance with the composition formulation that is used.

The substrate may comprise a metal, a heat-stable plastics material, wood, glass, or a ceramic or textile material. Advantageously, a metal substrate is chemically or mechanically cleaned prior to application of the composition, and is preferably subjected to chemical pre-treatment, for example, with iron phosphate, zinc phosphate or chromate. Substrates other than metallic are in general preheated prior to application or, in the case of electrostatic spray application, are pre-treated with a material that will aid such application.

The low gloss powder coating of the invention may be applied to substrates associated with a broad spectrum of markets, including furniture, automobiles, appliances and architecturally related.

The gloss of a cured powder coating can be measured in accordance with ASTM D 523-89 (Reapproved 1999), using a 60 degree gloss meter.

The invention will be elucidated with reference to the following examples. These are intended to illustrate the invention but are not to be construed as limiting in any manner the scope thereof.

Resin Examples

In the first stage of the process to prepare a polyester resin, the glycol components were placed in a reactor of sufficient size equipped with a stirrer, a distillation column connected to a water cooler condenser, an inlet for nitrogen and a thermometer. The mixture was heated to a temperature of approximately 100° C. while stirring under a light flow of nitrogen after which terephtalic acid, isophtalic acid, trimellitic anhydride and a small amount of tin catalyst were added. The content was heated further to a temperature of 250° C. until a hydroxyl functional polyester with AV<12 mg KOH/g was obtained. The content of the reactor was then cooled down to 200° C. The AV, viscosity and hydroxyl value were checked and the glycol loss was calculated. In the second stage of the process the remainder of isophtalic acid, adipic acid, trimellitic anhydride and the necessary glycol loss were added to the first stage hydroxyl functional polymer and the content was heated to 235° C. Some vacuum was applied until a carboxyl functional polyester with an AV as indicated in the table below was obtained. The content of the reactor was then cooled to 200° C. and discharged. In total 8 different resins were prepared. In table 1 the amounts of the different ingredients is indicated normalized to represent the molar ratio between the various components.

TABLE 1

Ingredients and molar ratio's of the ingredients used to prepare a carboxyl functional polyester resin.

| Resin example | | 1 | 2 | 3 | 4 |
|---|---|---|---|---|---|
| 1st stage | Neopentyl glycol | 1.08 | 1.09 | 0.86 | 1.023 |
| | Ethylene glycol | 0 | 0 | 0.02 | 0.05 |
| | Trimethyl-olpropane | 0 | 0 | 0.07 | 0 |
| | Terephtalic acid | 0.8 | 0.8 | 0.8 | 0.79 |
| | Isophtalic acid | 0.05 | 0.05 | 0.05 | 0.06 |
| | Trimellitic anhydride | 0.065 | 0.08 | 0 | 0.06 |
| 2nd stage | Isophtalic acid | 0.1 | 0.12 | 0.12 | 0.12 |
| | Adipic acid | 0.05 | 0.03 | 0.03 | 0.03 |
| | Trimellitic anhydride | 0.125 | 0.125 | 0.14 | 0.115 |
| | AV | 68 | 73.5 | 85.3 | 67 |

| Resin example | | 5 | 6 | 7[1] | 8[2] |
|---|---|---|---|---|---|
| 1st stage | Neopentyl glycol | 1.08 | 0.9 | 1 | 0.812 |
| | Ethylene glycol | 0 | 0 | 0 | 0 |
| | Trimethyl-olpropane | 0 | 0.06 | 0.02 | 0.03 |
| | Terephtalic acid | 0 | 0 | 0 | 0.78 |
| | Isophtalic acid | 0.85 | 0.85 | 0.85 | 0.07 |
| | Trimellitic anhydride | 0.065 | 0 | 0 | 0 |
| 2nd stage | Isophtalic acid | 0.15 | 0.12 | 0.12 | 0.12 |
| | Adipic acid | 0 | 0.03 | 0.03 | 0.03 |
| | Trimellitic anhydride | 0.125 | 0.13 | 0.14 | 0.05 |
| | AV | 70.6 | 78 | 69.2 | 56 |

TABLE 1-continued

Ingredients and molar ratio's of the ingredients used to prepare a carboxyl functional polyester resin.

[1]In this resin example only 12.5 wt. % of a branching monomer is added in stage 1
[2]In this resin example the amount of branching monomer is <6 wt. %

Powder Examples

The resins produced in the resin examples above were used to prepare powder coatings. These powder coatings were prepared in a conventional manner by extrusion, kibbling into chip form, and milling.

The formulation of the composition is as indicated in Table 2.

All powder coating compositions were applied by electrostatic deposition on metal panels at film thickness of 60 to 80 microns and cured in an oven 15 minutes at 200° C. After the cooling of coated substrates the gloss was measured. The results of this gloss measurements are also included in Table 2.

| Resin example | 1 | 2 | 3 | 4 |
|---|---|---|---|---|
| Resin from resin example | 27.51 | 27.45 | 27.31 | 27.6 |
| Uralac P823[1] | 41.27 | 41.17 | 40.97 | 41.4 |
| Uralac P883[2] | 0 | 0 | 0 | 0 |
| Primid XL552[3] | 5.07 | 5.24 | 5.57 | 4.85 |
| Benzoin | 0.3 | 0.3 | 0.3 | 0.3 |
| Flow control | 1.7 | 1.7 | 1.7 | 1.7 |
| Wax | 1 | 1 | 1 | 1 |
| Pigment/filler | 23.15 | 23.15 | 23.15 | 23.15 |
| gloss | 14 | 27 | 4 | 22 |

| Resin example | 5 | 6 | 7* | 8* |
|---|---|---|---|---|
| Resin from resin example | 41.24 | 41 | 41.36 | 27.96 |
| Uralac P823 | 0 | 0 | 0 | 41.94 |
| Uralac P883 | 41.24 | 41 | 41.36 | 0 |
| Primid XL552 | 6.37 | 6.86 | 6.13 | 3.95 |
| Benzoin | 0.3 | 0.3 | 0.3 | 0.3 |
| Flow control | 1.7 | 1.7 | 1.7 | 1.7 |
| Wax | 1 | 1 | 1 | 1 |
| Pigment/filler | 8.15 | 8.15 | 8.15 | 23.15 |
| gloss | 24 | 15 | 72 | 83 |

[1]Uralac P823 is a carboxylated polyester resin having an acid value of 20-24 mg KOH/g, ex DSM
[2]Uralac P883 is carboxylated polyester resin having an acid value of 18-22 mg KOH/g, ex DSM
[3]Primid XL 552 is a hydroxyalkylamide crosslinker, ex EMS
*Comparative example The comparative examples show that no low gloss coatings can be obtained when
  less than 15 wt. % of all components having at least 3 hydroxyl and/or acid functional groups are added to the reaction mixture in the first stage (resin example 7), or
  the total amount of hydroxyl functional components and acid functional components in the polyester resin originating from hydroxyl functional components and/or acid functional components having at least 3 functional groups per molecule is below 6 mol % of the total of hydroxyl functional components and acid functional components in the polyester resin (resin example 8).

The invention claimed is:

1. A process for the preparation of an acid functional polyester resin having an acid value of at least 60 mg KOH/g, using hydroxyl functional components and acid functional components, the hydroxyl functional components comprising components containing 2 hydroxyl functional groups per molecule and/or components containing at least 3 hydroxyl functional groups per molecule, the acid functional components comprising components containing 2 acid functional groups per molecule and/or components containing at least 3 acid functional groups per molecule, wherein more than 90 mol. % of the total of hydroxyl functional components in the polyester resin originate from neopentyl glycol (NPG), and from 6 to 11 mol % of the total of hydroxyl functional components and acid functional components in the polyester resin originating from hydroxyl functional components and/or acid functional components have at least 3 functional groups per molecule;

the process comprising: in a first stage of the process, adding all the hydroxyl functional components of the polymer to a reaction mixture as well as some acid functional components resulting in a hydroxyl functional pre-polymer; and in a second stage, adding the remaining acid functional components to the reaction mixture; and wherein in the first stage 15-60 mol. % of all components having at least 3 hydroxyl and/or acid functional groups are added to the reaction mixture, and in the second stage 40-85 mol % of the remaining components having at least 3 acid functional groups are added to the reaction mixture.

2. The process according to claim 1, wherein more than 95 mol % of the total of hydroxyl functional components in the resin originate from neopentyl glycol.

3. The process according to claim 1, wherein trimellitic acid or its anhydride is the acid functional component containing at least 3 acid functional groups per molecule.

4. The process according to claim 1, wherein the acid functional components containing 2 acid functional groups per molecule are selected from isophthalic acid (IPA), terephthalic acid (TPA), and adipic acid (AA).

5. The process according to claim 1, wherein the acid functional polyester resin has an acid value in the range of 70-110 mg KOH/g.

6. The process according to claim 1, wherein in the first stage 15-50 mol. % of all components having at least 3 acid or hydroxyl functional groups are added to the reaction mixture, and in the second stage 50-85 mol % of the remaining components having at least 3 acid functional groups are added to the reaction mixture.

\* \* \* \* \*